US007369828B2

(12) United States Patent
Shamsaifar

(10) Patent No.: US 7,369,828 B2
(45) Date of Patent: May 6, 2008

(54) ELECTRONICALLY TUNABLE QUAD-BAND ANTENNAS FOR HANDSET APPLICATIONS

(75) Inventor: Khosro Shamsaifar, Ellicott City, MD (US)

(73) Assignee: Paratek Microwave, Inc., Columbia, MD (US)

( * ) Notice: Subject to any disclaimer, the term of this patent is extended or adjusted under 35 U.S.C. 154(b) by 703 days.

(21) Appl. No.: 10/767,363

(22) Filed: Jan. 29, 2004

(65) Prior Publication Data

US 2005/0009472 A1 Jan. 13, 2005

Related U.S. Application Data

(60) Provisional application No. 60/445,348, filed on Feb. 5, 2003.

(51) Int. Cl.
*H04B 1/26* (2006.01)

(52) U.S. Cl. ................................ 455/193.1; 455/114.2; 455/333; 455/550.1; 343/702

(58) Field of Classification Search ............. 455/193.1, 455/193.2, 200.1, 201, 414.1, 63.4, 550.1, 455/562.1, 114.2, 101, 333; 343/702
See application file for complete search history.

(56) References Cited

U.S. PATENT DOCUMENTS

| | | | | |
|---|---|---|---|---|
| 5,312,790 | A | 5/1994 | Sengupta et al. | 501/137 |
| 5,427,988 | A | 6/1995 | Sengupta et al. | 501/137 |
| 5,486,491 | A | 1/1996 | Sengupta et al. | 501/137 |
| 5,593,495 | A | 1/1997 | Masuda et al. | 117/4 |
| 5,635,433 | A | 6/1997 | Sengupta | 501/137 |
| 5,635,434 | A | 6/1997 | Sengupta | 501/138 |
| 5,640,042 | A | 6/1997 | Koscica et al. | 257/595 |
| 5,693,429 | A | 12/1997 | Sengupta et al. | 428/699 |
| 5,694,134 | A | 12/1997 | Barnes | 343/700 |
| 5,766,697 | A | 6/1998 | Sengupta et al. | 427/585 |
| 5,812,943 | A * | 9/1998 | Suzuki et al. | 455/333 |
| 5,830,591 | A | 11/1998 | Sengupta et al. | 428/701 |
| 5,846,893 | A | 12/1998 | Sengupta et al. | 501/137 |
| 5,886,867 | A | 3/1999 | Chivukula et al. | 361/311 |
| 5,990,766 | A | 11/1999 | Zhang et al. | 333/205 |

(Continued)

*Primary Examiner*—Tony T. Nguyen
(74) *Attorney, Agent, or Firm*—James S. Finn

(57) ABSTRACT

An electronically tunable quad-band antenna which includes a tunable high band antenna tuned by at least one tunable varactor associated therewith; the tunable high band antenna further includes a substrate, a patch element on said substrate, at least one voltage tunable varactor associated with the patch element, a DC bias point on the patch element, an RF input on the patch element, and a temperature sensor associated with the high band pass antenna. Also included in a preferred embodiment of the electronically tunable quad-band antenna of the present invention is a tunable low band antenna tuned by at least one tunable varactor associated therewith, the tunable low band antenna further including a substrate, a patch element on said substrate, at least one voltage tunable varactor associated with said patch element, a DC bias point on said patch element, an RF input on said patch element, and a temperature sensor associated with said low band pass antenna.

Also included is a controller receiving control data, and receiving output information from said low band antenna and output information from said high band antenna and controlling a first bias voltage for biasing the at least one voltage tunable varactor associated with the high band antenna and a second bias voltage for biasing the at least one voltage tunable varactor associated with the low band antenna. The bias voltages can be provided by a DC to DC converter regulator.

24 Claims, 5 Drawing Sheets

U.S. PATENT DOCUMENTS 6,074,971 A 6/2000 Chiu et al. .................. 501/139
6,343,208 B1 * 1/2002 Ying ....................... 455/575.7
6,377,142 B1 4/2002 Chiu et al. .................. 333/238
6,377,217 B1 4/2002 Zhu et al. ................... 343/700
6,377,440 B1 4/2002 Zhu et al. ................... 361/311
6,384,785 B1 * 5/2002 Kamogawa et al. . 343/700 MS
6,404,614 B1 6/2002 Zhu et al. ................... 361/277
6,408,190 B1 * 6/2002 Ying ....................... 455/553.1
6,492,883 B2 12/2002 Liang et al. ................ 333/132
6,514,895 B1 2/2003 Chiu et al. .................. 501/137
6,525,630 B1 2/2003 Zhu et al. ................... 333/205
6,531,936 B1 3/2003 Chiu et al. .................. 333/164
6,535,076 B2 3/2003 Partridge et al. .......... 333/17.1
6,538,603 B1 3/2003 Chen et al. ................. 342/372
6,556,102 B1 4/2003 Sengupta et al. ........... 333/161
6,590,468 B2 7/2003 du Toit et al. ............. 333/17.3
6,597,265 B2 7/2003 Liang et al. ................ 333/204

* cited by examiner

ELECTRONICALLY TUNABLE QUAD-BAND ANTENNAS FOR HANDSET APPLICATIONS

CROSS-REFERENCE TO RELATED APPLICATION

This application claims priority to U.S. Provisional Patent Application Ser. No. 60/445,348, "ELECTRONICALLY TUNABLE QUAD-BAND ANTENNAS FOR HANDSET APPLICATIONS" filed Feb. 5, 2003, by Khosro Shamsaifar.

BACKGROUND OF THE INVENTION

The present invention relates generally antennas and more specifically to tunable antennas and still more specifically to tunable quad-band antennas for handset applications.

The current trend in mobile communications is in providing more and better services to the subscribers. Modern multi-mode, multi-band mobile phones will give better coverage and provide more data rates. This puts very stringent requirements on the components of the transceivers, including the antennas, which must handle these new features.

A Quad-Band handset radio transceiver is an example of a multi-mode, multi-band system. It covers the following frequency bands and standards:

824-894 MHz;
880-960 MHz;
1710-1880 MHz;
1850-1990 MHz;
GSM850;
EGSM;
GSM 1800; and
PCS 1900.

In order to provide for quad-band antennas the need exists to provide a good match to the transmit and receive modules over more than 15% of their frequency bands. This may not always be achievable without utilizing sophisticated and expensive antennas. Using expensive and sophisticated antennas with consumer handsets is problematic. Therefore, a strong need in the industry exists for quad-band antennas with excellent performance and is cost effective.

SUMMARY OF THE INVENTION

The present invention provides an electronically tunable quad-band antenna which includes a tunable high band antenna tuned by at least one tunable varactor associated therewith; the tunable high band antenna further includes a substrate, a patch element on the substrate, at least one voltage tunable varactor associated with the patch element, a DC bias point on the patch element, an RF input on the patch element, and a temperature sensor associated with the high band pass antenna. Also included in a preferred embodiment of the electronically tunable quad-band antenna of the present invention is a tunable low band antenna tuned by at least one tunable varactor associated therewith, the tunable low band antenna further including a substrate, a patch element on the substrate, at least one voltage tunable varactor associated with the patch element, a DC bias point on the patch element, an RF input on the patch element, and a temperature sensor associated with the low band pass antenna.

Also included in a preferred embodiment of the electronically tunable quad-band antenna of the present invention is a controller receiving control data, and receiving output information from the low band antenna and output information from the high band antenna and controlling a first bias voltage for biasing the at least one voltage tunable varactor associated with the high band antenna and a second bias voltage for biasing the at least one voltage tunable varactor associated with the low band antenna. The first and second bias voltages can be provided by a DC to DC converter regulator. In one preferred embodiment of the present invention the quad band antenna covers the following frequency bands and standards: 824-894 MHz; 880-960 MHz; 1710-1880 MHz; 1850-1990 Hz; GSM850; EGSM; GSM 1800; and PCS 1900.

The present invention also provides for a method of transmitting and receiving RF signals from multiple frequency bands utilizing an electronically tunable multiple band antenna, comprising the steps of: providing a high band antenna with at least one voltage tunable varactor associated therewith, the high band antenna providing a first input to a controller; providing a low band antenna with at least one voltage tunable varactor associated therewith, the low band antenna providing a second input to the controller; and inputting control data to the controller and controlling a first bias voltage for biasing the at least one voltage tunable varactor associated with the high band antenna and a second bias voltage for biasing the at least one voltage tunable varactor associated with the low band antenna.

The controller of the present method can use a DC voltage supply to provide the DC voltage needed to bias the voltage tunable varactors. The high band antenna of the present method can further comprise: a substrate; a patch element on the substrate; at least one voltage tunable varactor associated with the patch element; a DC bias point on the patch element; an RF input on the patch element; a temperature sensor; and a ground plane on one side of the substrate.

The low band antenna of the present method can further comprise: a substrate; a patch element on the substrate; at least one voltage tunable varactor associated with the patch element; a DC bias point on the patch element; an RF input on the patch element; a temperature sensor; and a ground plane on one side of the substrate.

In a more specific embodiment of a preferred method of the present invention the multiple band antenna is a quad band antenna and covers the following frequency bands and standards: 824-894 MHz; 880-960 MHz; 1710-1880 MHz; 1850-1990 Hz; GSM850; EGSM; GSM1800; and PCS 1900.

DESCRIPTION OF THE PREFERRED EMBODIMENT

The present invention provides electronically tunable antennas used in multi-band, multi-mode mobile phones applications. The preferred tuning elements are voltage-controlled tunable dielectric capacitors placed on the antenna package. The present technology makes tunable antennas very promising in the contemporary mobile communication system applications. Thus, it is an object of the present invention to provide a tunable antenna for Handset applications, which, in a preferred embodiment consists of two tunable antennas in the same package. The first antenna covers the low band (824-960 MHz), and the second antenna covers the high band (1710-1990 MHz). Both of the antennas need to provide a good match to the transmit and receive modules over more than 15% of their frequency bands. In typical architectures, this would not always be achievable without going to sophisticated and expensive antennas. However, this problem can easily be solved by using an electronically tunable antenna. With a tunable antenna, a good match can always be obtained at the frequency of interest. Inherent in every tunable antenna is the ability to rapidly tune the response using high-impedance control lines. The assignee of the present invention has developed and patented tunable materials technology such as the tunable filter using tunable dielectric capacitors set forth in U.S. Pat. No. 6,525,630 entitled, “Microstrip tunable filters tuned by dielectric varactors”, issued Feb. 25, 2003 by Zhu et al. This patent is incorporated in by reference. Also, patent application Ser. No. 09/457,943, entitled, “ELECTRICALLY TUNABLE FILTERS WITH DIELECTRIC VARACTORS” filed Dec. 9, 1999, by Louise C. Sengupta et al. This application is incorporated in by reference.

The assignee of the present invention and in the patent and patent application incorporated by reference has developed the materials technology that enables these tuning properties, as well as, high Q values resulting low losses and extremely high IP3 characteristics, even at high frequencies. The articulation of the novel tunable material technology is elaborated on in the patent and patent application incorporated in by reference.

Electronically tunable dielectric capacitors or varactors are used as tuning elements. The varactors are mounted on the antenna block and are biased using a DC bias circuit. By changing the bias voltage of the varactors, their capacitance will change, which will tune the frequency response of the antenna. There is also a temperature sensor on the antenna that reads the current temperature at any time and inputs the information to the controller. The controller will provide the correct voltage at any temperature to tune the antenna to the desired frequency, using a look up table. The data in the look up table are generated previously through a calibration process.

Figure 1:
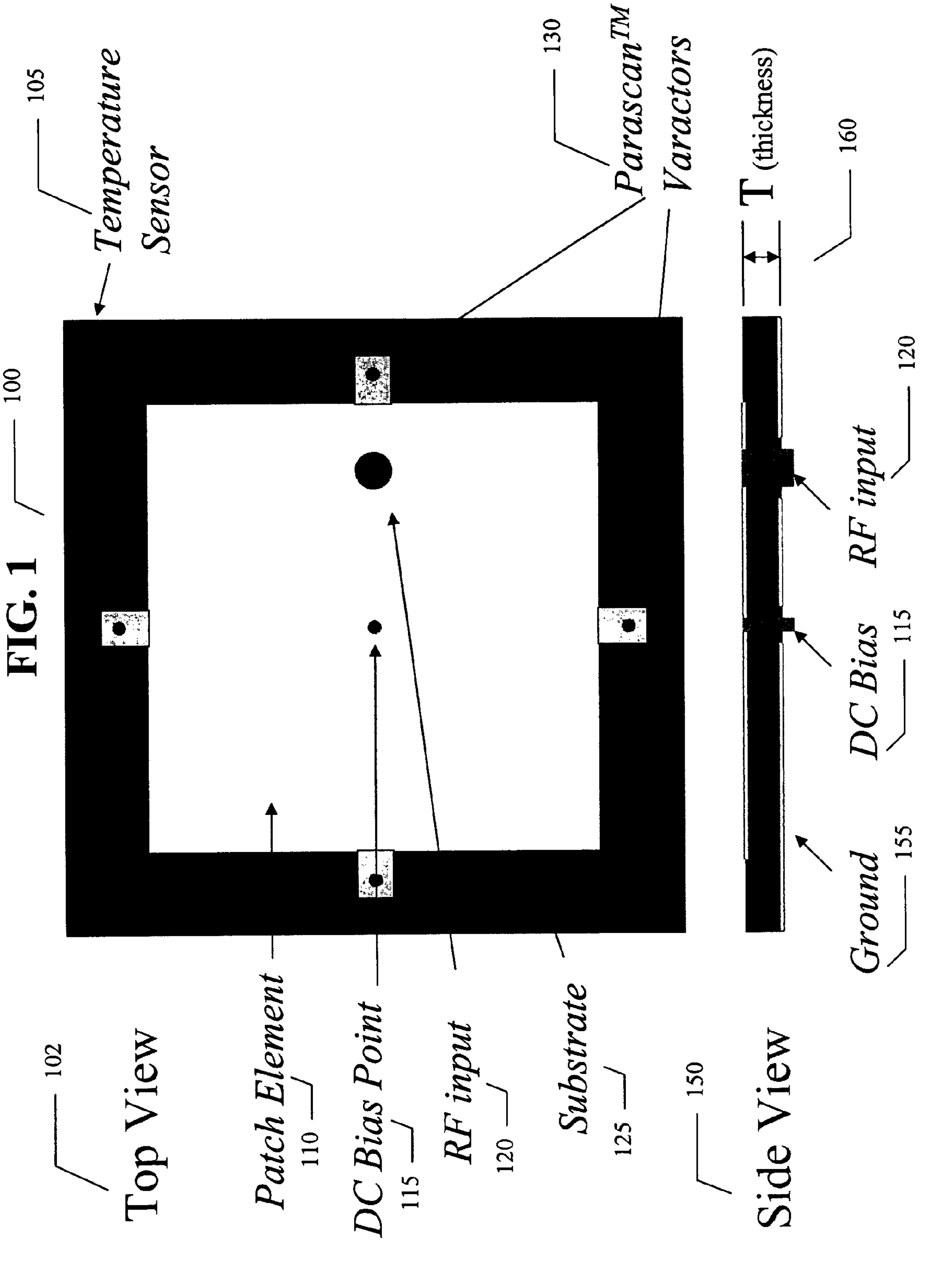
FIG. 1 shows a top and side perspective of a preferred antenna configuration of the present invention with Parascan Tunable Capacitors incorporated therein.

Turning now to the figures, FIG. 1 shows a top and side perspective of a preferred antenna configuration of the present invention with Parascan Tunable Capacitors incorporated therein, wherein FIG. 1 at 102 shows the top view of a tunable patch antenna 100 utilized in a preferred embodiment of the present invention. Included in tunable patch antenna 100 is substrate 125 on which a patch element 110 is placed. A temperature sensor 105 is also associated with substrate 125. On patch element 110 is placed a DC bias point 115 and RF input 120. The DC bias point 115 provides bias to Parascan® Varactors (i.e., voltage tunable dielectric varactors) 130.

Shown at 150 is the side view of patch antenna 100, with DC Bias point 115 and RF input 120 shown from the side perspective. Ground 155 is more easily seen in the side perspective 150 as is the thickness, shown at 160.

Figure 2:
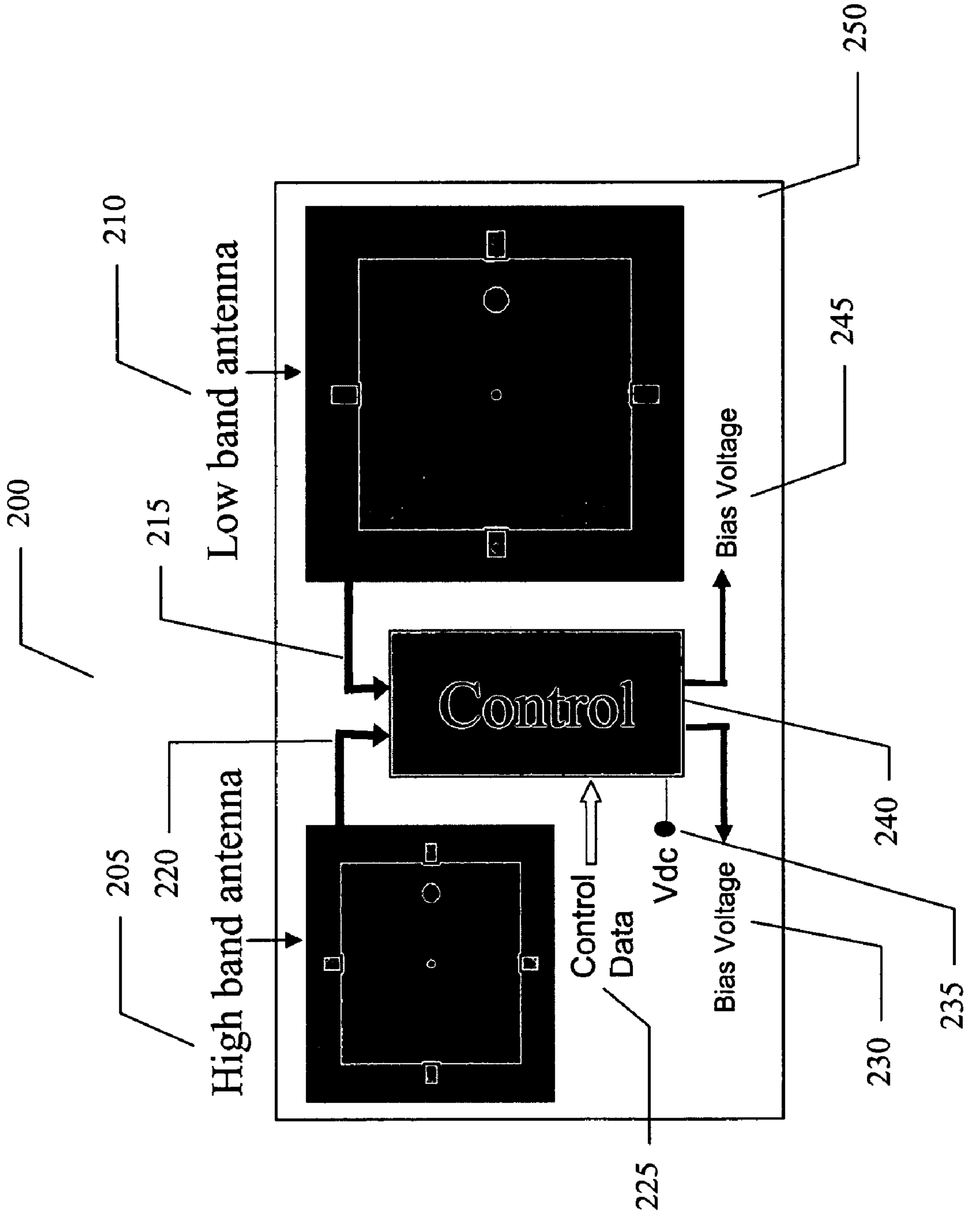
FIG. 2 illustrates the layout of the quad-band tunable patch antennas (TPA) system with controller of a preferred embodiment of the present invention.

FIG. 2, shown generally as 200, illustrates the layout of the quad-band tunable patch antennas (TPA) system with controller of a preferred embodiment of the present invention. The Bias Circuits are not shown but are well known to one skilled in the art. High band antenna 205 is placed within antenna package 250. Low band antenna 210 is also placed within antenna package 250. The output 215 of low band antenna 210 and the output 220 of high band antenna 205 is input to controller 240. Control data 225 is also input to controller 240. Bias voltage 230 and 245 are also provided to bias voltage controlled varactors (shown with reference numerals in FIG. 1) associated with high band antenna 205 and low band antenna 210.

Figure 3:
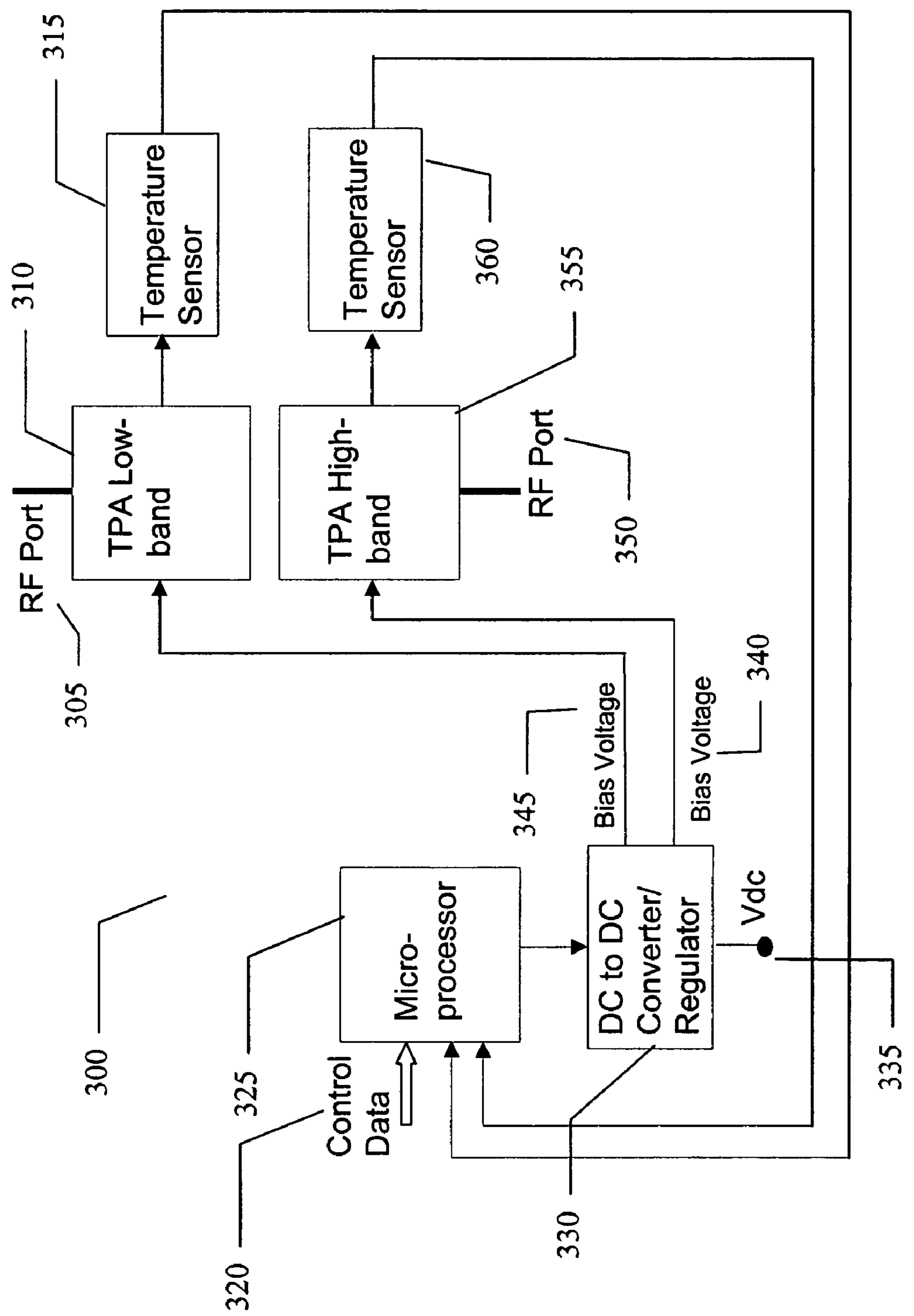
FIG. 3 is a block diagram of the quad-band tunable patch antennas (TPA) system with the controller of a preferred embodiment of the present invention.

FIG. 3, shown generally as 300, is a block diagram of the quad-band tunable patch antennas (TPA) system with controller of a preferred embodiment of the present invention. Microprocessor 325 receives input from temperature sensor 315 and temperature sensor 360 as well as control data 320. Temperature sensor 315 senses temperature information from TPA low band 310, and temperature sensor 360 senses temperature information from TPA high band 355. This temperature information and control data is used, via a look up table, to determine the correct output for DC to DC to Converter/Regulator 330, thereby providing for the correct bias voltage. Vdc is provided to DC to DC Converter/Regulator 330 at 335. DC to DC Converter/Regulator 330 outputs bias voltage 345 to the tunable varactors (not shown in FIG. 3) associated with TPA low band 305 and bias voltage to the tunable varactors (not shown in FIG. 3) associated with TPA high band at 355. RF port 305 is provided for TPA low band and RF port 350 is provided for TPA high band.

Figure 4:
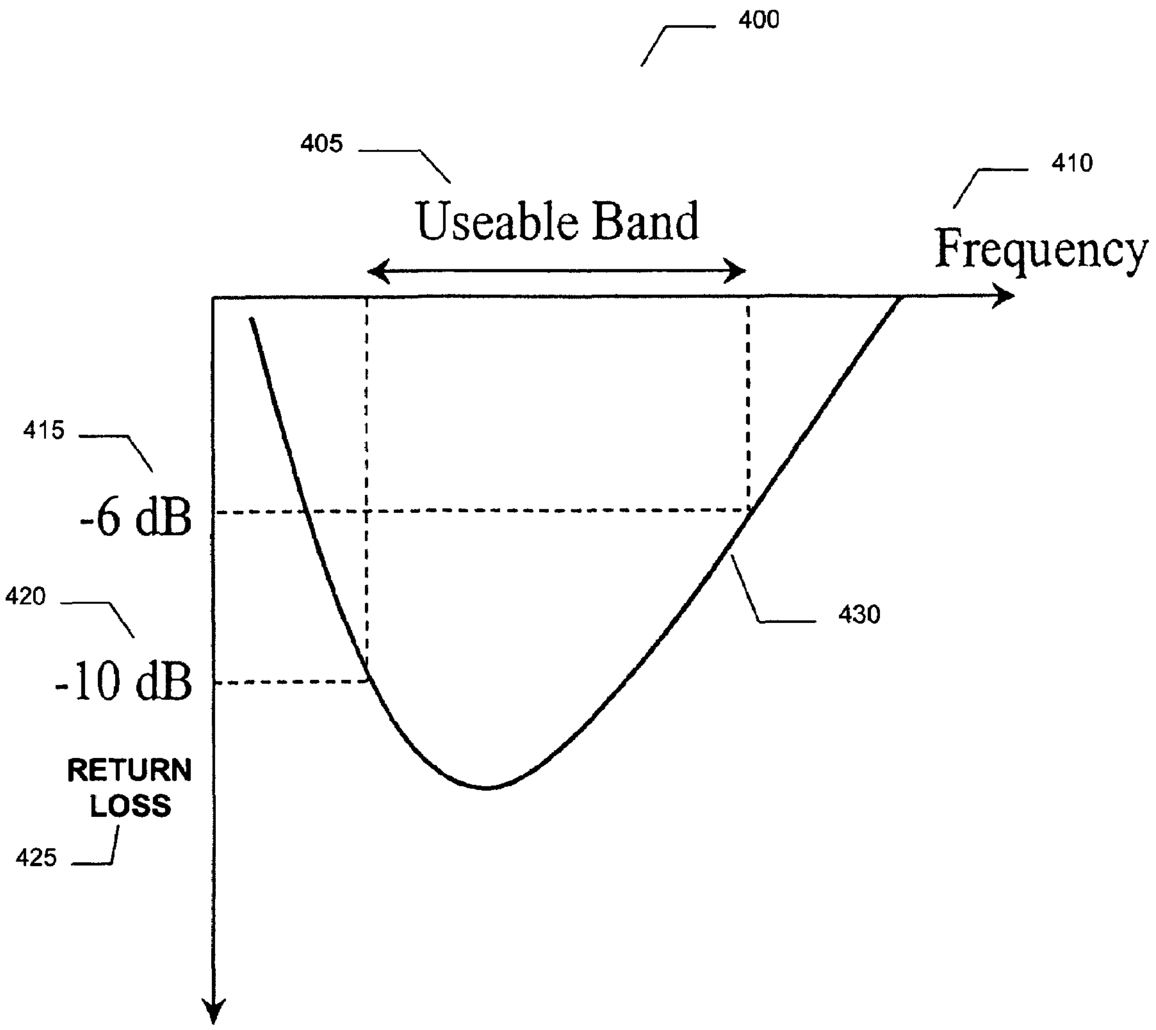
FIG. 4 is a graph depicting the return loss of a fixed antenna.

FIG. 4 at 400 is a graph of Frequency 410 vs. Return Loss 425 depicting the return loss of a fixed antenna and thereby the performance of the current fixed antenna solution. The useable band 405 is the intersection of line 430 at the −6 dB level 415 and the vertical intersection of the line formed by the intersection of the line at the −10 dB return loss level. This shows that at higher frequencies it gets degraded (it shows only −6 dB of return loss at the upper edge of the band), because of the bandwidth limitation of the antenna.

The instantaneous bandwidth of the antenna is smaller, which can result in a better match. By providing tunability, at any frequency of operation within the useable bandwidth, the good match can be provided everywhere.

Figure 5:
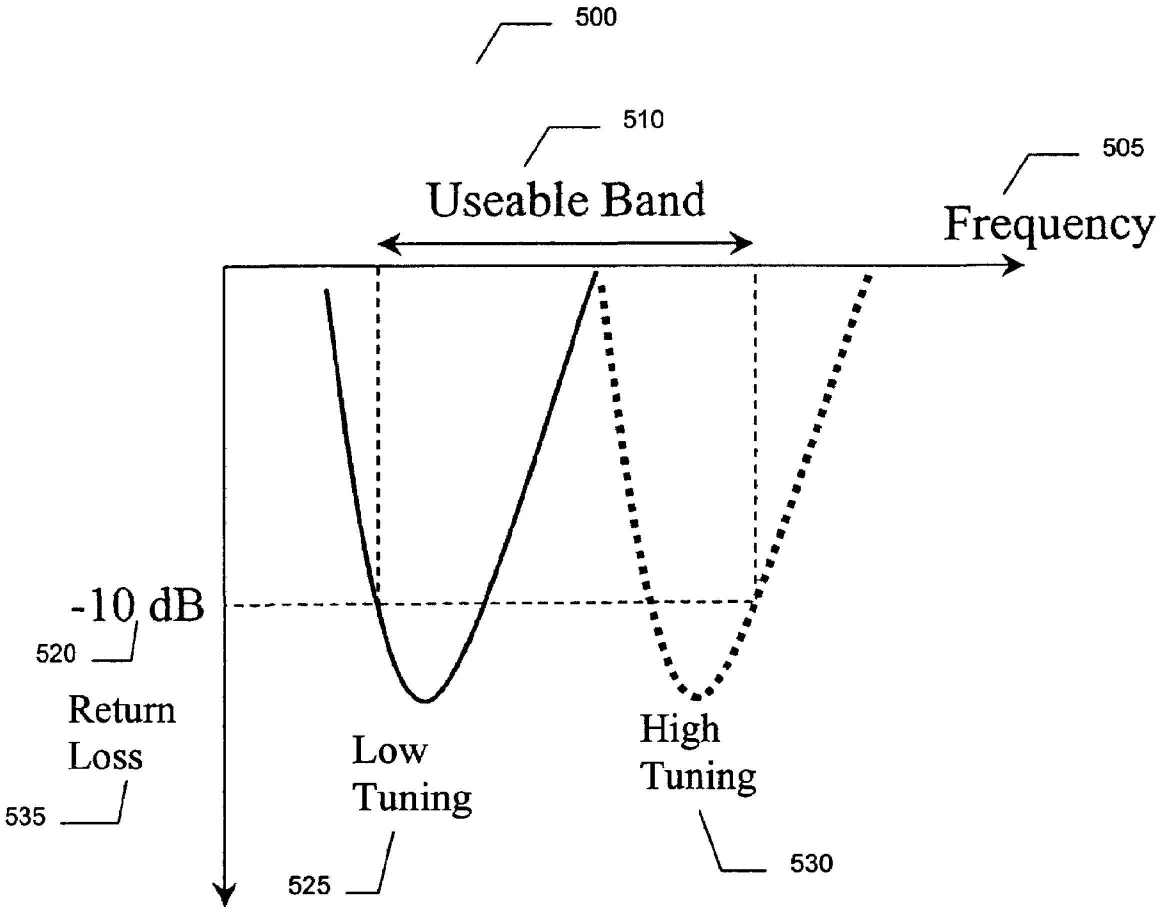
FIG. 5 is a graph depicting the return loss of a tunable antenna at two tuning stages.

FIG. 5, shown generally at 500, is a graph depicting the Return Loss 535 vs. Frequency 505 of a tunable antenna at two tuning stages. The first tuning stage is low tuning at 525 and the second tuning stage is the high tuning at 530. These are the two extremes. The usable band 510 is the intersection of return loss at −10 dB. As it can be seen from FIG. 5 the antenna will always provide a good match over the entire frequency band of interest.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

All cited patent documents and publications in the above description are incorporated herein by reference.

What is claimed is:

1. An electronically tunable multiple band antenna, comprising:

a high band antenna with at least one tunable element associated therewith, said high band antenna providing a first input to a controller and comprising:

a substrate;

a patch element on said substrate;

at least one voltage tunable varactor associated with said patch element;

a DC bias point on said patch element; and an RF input on said patch element;

a low band antenna with at least one tunable element associated therewith, said low band antenna providing a second input to said controller; and said controller further receiving control data and controlling a first bias for biasing said at least one tunable element associated with said high band antenna and a second bias for biasing said at least one tunable element associated with said low band antenna.

2. The electronically tunable multiple band antenna of claim 1, further comprising a DC voltage supply provided to said controller.

3. The electronically tunable multiple band antenna of claim 1, wherein said high band antenna further comprises a temperature sensor associated with said high band pass antenna.

4. The electronically tunable multiple band antenna of claim 1, wherein said high band antenna further comprises a ground plane on one side of said substrate.

5. The electronically tunable multiple band antenna of claim 1, wherein said low band antenna further comprises:

a substrate;

a patch element on said substrate;

at least one voltage tunable varactor associated with said patch element;

a DC bias point on said patch element; and an RF input on said patch element.

6. The electronically tunable multiple band antenna of claim 1, wherein said low band antenna further comprises a temperature sensor associated with said low band pass antenna.

7. The electronically tunable multiple band antenna of claim 1, wherein said low band antenna further comprises a ground plane on one side of said substrate.

8. The electronically tunable multiple band antenna of claim 1, wherein said multiple band antenna is a quad band antenna.

9. The electronically tunable multiple band antenna of claim 8, wherein said control data is information to enable tuning for reception and transmission of predetermined frequency bands.

10. The electronically tunable multiple band antenna of claim 9, wherein said quad band antenna covers the following frequency bands and standards: 824-894 MHz; 880-960 MHz; 1710-1880 MHz; 1850-1990 Hz; GSM850; EGSM; GSM 1800; and PCS 1900.

11. A method of transmitting and receiving RF signals from multiple frequency bands utilizing an electronically tunable multiple band antenna, comprising the steps of:

providing a high band antenna with at least one voltage tunable varactor associated therewith, said high band antenna providing a first input to a controller and comprising:

a substrate;

a patch element on said substrate;

at least one voltage tunable varactor associated with said patch element;

a DC bias point on said patch element; and an RF input on said patch element;

providing a low band antenna with at least one voltage tunable varactor associated therewith, said low band antenna providing a second input to said controller; and inputting control data to said controller and controlling a first bias voltage for biasing said at least one voltage tunable varactor associated with said high band antenna and a second bias voltage for biasing said at least one voltage tunable varactor associated with said low band antenna.

12. The method of transmitting and receiving RF signals from multiple frequency bands utilizing an electronically tunable multiple band antenna of claim 11, further comprising providing a DC voltage supply to said controller.

13. The method of transmitting and receiving RF signals from multiple frequency bands utilizing an electronically tunable multiple band antenna of claim 11 wherein said high band antenna further comprises a temperature sensor associated with said high band pass antenna.

14. The method of transmitting and receiving RF signals from multiple frequency bands utilizing an electronically tunable multiple band antenna of claim 11, wherein said high band antenna further comprises a ground plane on one side of said substrate.

15. The method of transmitting and receiving RF signals from multiple frequency bands utilizing an electronically tunable multiple band antenna of claim 11, wherein said low band antenna further comprises:

a substrate;

a patch element on said substrate;

at least one voltage tunable varactor associated with said patch element;

a DC bias point on said patch element; and an RF input on said patch element.

16. The method of transmitting and receiving RF signals from multiple frequency bands utilizing an electronically tunable multiple band antenna of claim 11, wherein said low band antenna further comprises a temperature sensor associated with said low band pass antenna.

17. The method of transmitting and receiving RF signals from multiple frequency bands utilizing an electronically tunable multiple band antenna of claim 11, wherein said low band antenna further comprises a ground plane on one side of said substrate.

18. The method of transmitting and receiving RF signals from multiple frequency bands utilizing an electronically tunable multiple band antenna of claim 11, wherein said multiple band antenna is a quad band antenna.

19. The method of transmitting and receiving RF signals from multiple frequency bands utilizing an electronically tunable multiple band antenna of claim 18, wherein said quad band antenna covers the following frequency bands and standards: 824-894 MHz; 880-960 MHz; 1710-1880 MHz; 1850-1990Hz; GSM850; EGSM; GSM 1800; and PCS 1900.

20. An electronically tunable quad-band antenna, comprising:

a tunable high band antenna tuned by at least one tunable varactor associated therewith;

said tunable high band antenna further comprising:

a substrate;

a patch element on said substrate;

at least one voltage tunable varactor associated with said patch element;

a DC bias point on said patch element;

an RF input on said patch element; and a temperature sensor associated with said high band pass antenna;

a tunable low band antenna tuned by at least one tunable varactor associated therewith said tunable low band antenna further comprising:

a substrate;

a patch element on said substrate;

at least one voltage tunable varactor associated with said patch element;

a DC bias point on said patch element;

an RE input on said patch element; and a temperature sensor associated with said low band pass antenna;

a controller receiving control data, output information from said low band antenna and output information from said high band antenna and controlling a first bias voltage for biasing said at least one voltage tunable varactor associated with said high band antenna and a second bias voltage for biasing said at least one voltage tunable varactor associated with said low band antenna.

21. The electronically tunable quad-band antenna of claim 20, wherein said first and second bias voltages are provided by a DC to DC converter regulator.

22. The electronically tunable quad-band antenna of claim 20, wherein said quad band antenna covers the following frequency bands and standards: 824-894 MHz; 880-960 MHz; 1710-1880 MHz; 1850-1990 Hz; GSM 850; EGSM; GSM 1800; and PCS 1900.

23. A method of transmitting and receiving RF signals from multiple frequency bands utilizing an electronically tunable multiple band antenna, comprising the steps of:

providing a high band antenna with at least one voltage tunable varactor and a temperature sensor associated with said high band pass antenna associated therewith, said high band antenna providing a first input to a controller;

providing a low band antenna with at least one voltage tunable varactor associated therewith, said low band antenna providing a second input to said controller; and inputting control data to said controller and controlling a first bias voltage for biasing said at least one voltage tunable varactor associated with said high band antenna and a second bias voltage for biasing said at least one voltage tunable varactor associated with said low band antenna.

24. A method of transmitting and receiving RF signals from multiple frequency bands utilizing an electronically tunable multiple band antenna, comprising the steps of:

providing a high band antenna with at least one voltage tunable varactor associated with said high band pass antenna associated therewith, said high band antenna providing a first input to a controller;

providing a low band antenna with at least one voltage tunable varactor associated therewith, said low band antenna providing a second input to said controller and comprising:

a substrate;

a patch element on said substrate;

at least one voltage tunable varactor associated with said patch element;

a DC bias point on said patch element; and an RF input on said patch element; and inputting control data to said controller and controlling a first bias voltage for biasing said at least one voltage tunable varactor associated with said high band antenna and a second bias voltage for biasing said at least one voltage tunable varactor associated with said low band antenna.

* * * * *